United States Patent
Chen (10) Patent No.: US 7,983,705 B1
(45) Date of Patent: Jul. 19, 2011

(54) PUSH-TO-TALK COMMUNICATION MANAGEMENT SYSTEM

(75) Inventor: Chaofeng Chen, Leesburg, VA (US)

(73) Assignee: Sprint Communications Company L.P., Overland Park, KS (US)

(*) Notice: Subject to any disclaimer, the term of this patent is extended or adjusted under 35 U.S.C. 154(b) by 503 days.

(21) Appl. No.: 12/201,197

(22) Filed: Aug. 29, 2008

(51) Int. Cl.
   *H04B 7/00* (2006.01)
   *H04M 3/42* (2006.01)
   *H04W 68/00* (2009.01)
   *H04B 1/38* (2006.01)
   *H04L 12/16* (2006.01)
   *H04Q 11/00* (2006.01)
   *H04W 4/00* (2009.01)
   *H04L 12/28* (2006.01)
   *H04L 12/56* (2006.01)
   *H04M 15/00* (2006.01)

(52) U.S. Cl. ........ 455/518; 455/416; 455/458; 455/574; 370/260; 370/338; 370/389; 379/126

(58) Field of Classification Search ............... 455/67, 455/90.1, 90.2, 404.1, 413, 414, 416, 422, 455/426, 445, 450, 452, 461, 509, 512, 517, 455/518, 519, 520, 521, 550, 552, 553, 556, 455/557, 563, 564.569, 575; 370/70, 312, 370/254, 260, 311, 338, 340, 342, 345, 352, 370/389, 390, 484; 379/67, 88, 89, 126, 379/354, 355
See application file for complete search history.

(56) References Cited

U.S. PATENT DOCUMENTS

| | | | |
|---|---|---|---|
| 5,983,114 A | 11/1999 | Yao et al. | |
| 6,330,602 B1* | 12/2001 | Law et al. | 709/224 |
| 6,567,848 B1* | 5/2003 | Kusuda et al. | 709/219 |
| 6,847,639 B2* | 1/2005 | Barathan et al. | 370/389 |
| 6,976,090 B2* | 12/2005 | Ben-Shaul et al. | 709/246 |
| 7,035,918 B1* | 4/2006 | Redding et al. | 709/223 |
| 2003/0152040 A1* | 8/2003 | Crockett et al. | 370/260 |
| 2006/0007901 A1 | 1/2006 | Roskowski et al. | |
| 2006/0023642 A1 | 2/2006 | Roskowski et al. | |

* cited by examiner

*Primary Examiner* — Andrew Wendell
*Assistant Examiner* — Paul P Tran (57) ABSTRACT

In a push-to-talk communication system, a domain name server transfers a registration server role, call server role, and media server role. A first server receives the registration server role and responsively registers push-to-talk users and maintains a first time of day. A second server receives the call server role and responsively establishes push-to-talk calls and maintains a second time of day. A third server receives the media server role and responsively transfers push-to-talk media and maintains a third time of day. A management system receives and processes data from the servers to verify that their time of day is synchronized and to verify that the servers are performing their assigned push-to-talk roles.

20 Claims, 5 Drawing Sheets

PUSH-TO-TALK COMMUNICATION MANAGEMENT SYSTEM

TECHNICAL BACKGROUND

Push-to-talk is a method of conversing over a communication link using a button to switch from transmit mode to receiving mode. In the past, two-way radios, or walkie-talkies, transmitted tones or voice communications over a selected channel or frequency. Today, many mobile phone service providers offer a push-to-talk communication option over a cellular telephone network.

During a typical push-to-talk session, one person speaks while the other one listens. Unlike a traditional mobile telephone call, a user cannot simultaneously hear the other party and be heard by the other party. A mobile handset may be used for mobile telephone network push-to-talk communications, but other wireless devices, such as a personal digital assistant or a personal computer, may also be used for push-to-talk communications.

Overview

In a push-to-talk communication system, a domain name server transfers a registration server role, call server role, and media server role. A first server receives the registration server role and responsively registers push-to-talk users and maintains a first time of day. A second server receives the call server role and responsively establishes push-to-talk calls and maintains a second time of day. A third server receives the media server role and responsively transfers push-to-talk media and maintains a third time of day. A management system receives and processes data from the servers to verify that their time of day is synchronized and to verify that the servers are performing their assigned push-to-talk roles.

DETAILED DESCRIPTION

Figure 1:
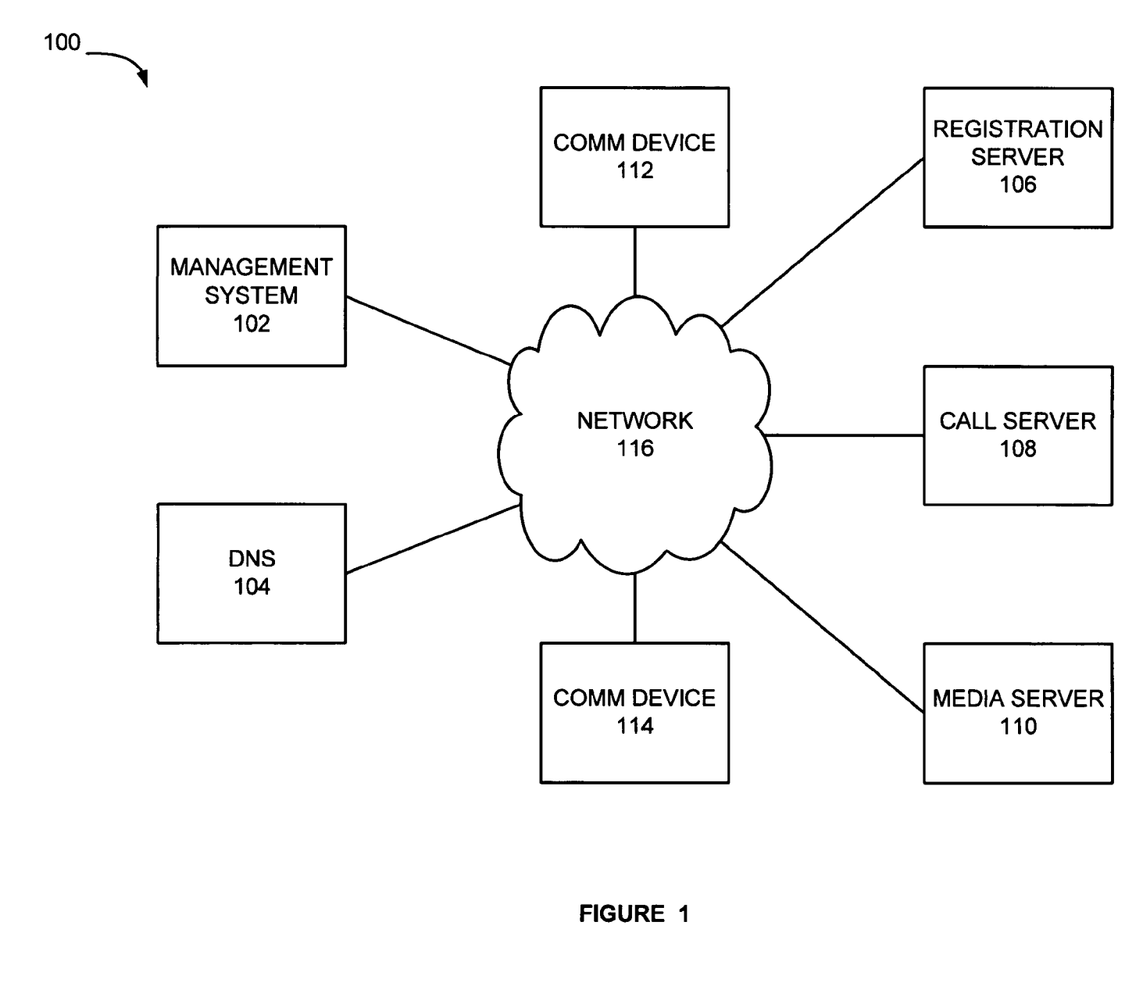
FIG. 1 is a block diagram that illustrates a push-to-talk communication system.

FIG. 1 is a block diagram that illustrates push-to-talk communication system 100. Push-to-talk communication system 100 comprises management system 102, Domain Name Server (DNS) 104, registration server 106, call server 108, media server 110, communication device 112, communication device 114, and communication network 116. There are typically more servers and communication devices, but their number has been restricted for clarity. Communication network 116 exchanges communications between management system 102, domain name server 104, registration server 106, call server 108, media server 110, communication device 112, and communication device 114.

Management system 102 comprises a computer system, and a version of management system 102 is provided further below. DNS 104, registration server 106, call server 108, and media server 110 each comprise a computer system with operating system software and push-to-talk application software. Communication devices 112 and 114 comprise telephones, Personal Digital Assistants (PDA's), wireless transceivers, computers, or some other communication apparatus. Communication network 116 includes wireless access points, routers, servers, gateways, communications links, or some other network elements.

DNS 104 assigns push-to-talk roles to servers 106, 108, and 110. Servers 106, 108, and 110 can handle whichever push-to-talk roles they are assigned. In this example, server 106 has a registration role, server 108 has a call set-up role, and server 110 has a media transfer role. In other examples, DNS server 104 might assign these push-to-talk roles differently. Management system 102 verifies that servers 106, 108, and 110 are performing their assigned roles in addition to other push-to-talk management tasks as described below.

In operation, server 106 transfers a message to DNS 104 indicating that it is ready to perform a push-to-talk role. In response to the message, DNS 104 selects a role for server 106 to optimize network operations. For example, DNS 104 may load balance the roles across the servers based on the current demand for each role. In this example, DNS 104 transfers a response indicating a push-to-talk registration server role to server 106. Likewise, server 108 transfers a message to DNS 104 indicating that it is ready to perform a push-to-talk role. In response to the message, DNS 104 selects a role for server 108 to optimize network operations. In this example, DNS 104 transfers a response indicating a push-to-talk call server role to server 108. In addition, server 110 transfers a message to DNS 104 indicating that it is ready to perform a push-to-talk role. In response to the message, DNS 104 selects a role for server 110 to optimize network operations. In this example, DNS 104 transfers a response indicating a push-to-talk media server role to server 110.

Server 106 receives its response and begins to perform the push-to-talk registration server role by registering users for push-to-talk service. The registration entails receiving and storing device identification codes and associated Internet Protocol (IP) addresses from each prospective user. Server 106 also maintains a time of day to assist in push-to-talk operations.

Server 108 receives its response and begins to perform the push-to-talk call server role by establishing push-to-talk sessions for the registered users. The establishment entails: receiving a push-to-talk request from an originating user that has the originating user's IP address and the device identification code of the target user, accessing a registration server to translate the target user's device identification code into their IP address, obtaining session acceptance from the target user, and transferring the respective IP addresses for the two users to a media server. Server 108 also maintains a time of day to assist in push-to-talk operations.

Server 110 receives its response and begins to perform the push-to-talk media server role by transferring push-to-talk media between the users. The transfer entails establishing links to each user using their IP addresses and exchanging voice communications between the users over the links. Server 110 also maintains a time of day to assist in push-to-talk operations.

Management system 102 receives data from servers 104, 106, 108, and 110. This data may periodically retrieved by system 102 or automatically pushed to system 102. Management system 102 processes the data to verify that the time of day in servers 104, 106, 108, and 110 are synchronized with one another. Management system 102 also processes the data to verify that server 106 is performing the registration server role, that server 108 is performing the call server role, and that server 110 is performing the media server role.

In some examples, the data from registration server 106 includes data from both the operating system and the push-to-talk application in server 106. The data from the operating system indicates the processes that are being performed by the push-to-talk application to perform the registration server role. The data from the call server 108 includes data from both the operating system and the push-to-talk application in server 108. The data from the operating system indicates the processes that are being performed by the push-to-talk application to perform the call server role in server 108. The data from server 110 includes data from both the operating system and the push-to-talk application in server 110. The data from the operating system indicates the processes that are being performed by the push-to-talk application to perform the media server role in server 110. Management system 102 assesses the performance of server 106 in the registration server role by analyzing the processes as reported by the operating system in server 106. Management system 102 assesses the performance of server 108 in the call server role by analyzing the processes as reported by the operating system in server 108. Management system 102 assesses the performance of server 110 in the media server role by analyzing the processes as reported by the operating system in server 110. The analysis might entail comparing the actual processes being performed to a list of expected processes that should be performed. The analysis might entail verifying that the processes are responding to the operating system.

In some examples, the data from registration servers 106, 108, and 110 identifies the IP addresses that are used to communicate with other push-to-talk servers. Management system 102 translates these IP addresses into respective communication links between the push-to-talk servers. Management system 102 then compares the communication links to an authorized link configuration. Management system 102 identifies unauthorized IP addresses when their corresponding communication link is not in the authorized link configuration. Management system 102 also identifies missing communication links that are in the authorized link configuration but have no corresponding IP addresses in the servers.

In some examples, the data from registration servers 106, 108, and 110 identifies message queue information associated with the communication links. The message queue typically indicates a current state, such as a % load, of the message queue for the communication link. Management system 102 assesses the performance of server 106 in its role as a registration server by processing the message queue information associated with the communication links coupled to server 106. Management system 102 assesses the performance of server 108 in its role as a call server by processing the message queue information associated with the communication links coupled to server 108. Management system 102 assesses the performance of server 110 in its role as a media server by processing the message queue information associated with the communication links coupled to server 110. This message queue analysis may be helpful when using load balancing to assign roles. More servers of a given role may be needed if the message queues for that type of server are too full, especially when the message queues for another type of server are relatively empty.

Push-to-talk servers may operate in a primary mode or a back-up mode, where the primary mode indicates that a server is actively working with users, and where the back-up mode indicates that the server is not active with users but minors the data in a primary server and is ready to become active with the users if the primary server fails. In some examples, the data from registration servers 106, 108, and 110 includes information that indicates whether a given server is operating in a primary mode or in a back-up mode. The information may include the active push-to-talk processes, IP addresses in-use, and the communication link loading. A server in primary mode will have more processes, IP addresses, and link loading than a server in back-up mode.

Figure 2:
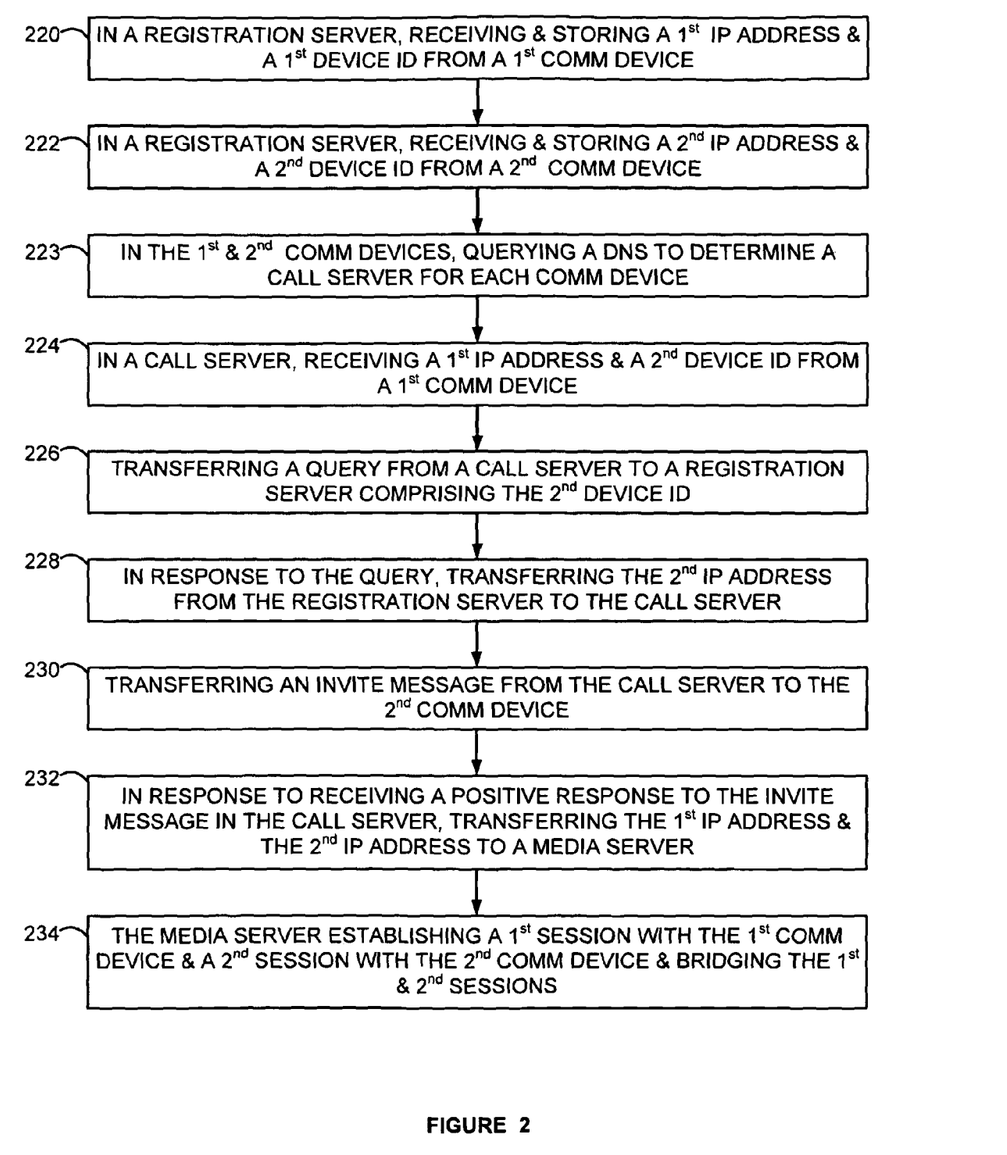
FIG. 2 is a flow diagram that illustrates a method of operating a push-to-talk communication system.

FIG. 2 is a flow diagram that illustrates a method of operating communication system 100. Communication device 112 registers with registration server 106 by transferring its Internet Protocol (IP) address and its device identifier to registration server 106 via network 116. The device identifier comprises a push-to-talk identification code, a 10-digit telephone number, or some other form of device identification. Registration server 106 receives and stores the IP address and the device identifier for communication device 112 (operation 220).

Communication device 114 registers with registration server 106 by transferring its Internet Protocol (IP) address and its device identifier to registration server 106 via network 116. The device identifier comprises a push-to-talk identification code, a 10-digit telephone number, or some other form of device identification. Registration server 106 receives and stores the IP address and the device identifier for communication device 114 (operation 222).

Communication device 112 then transmits a query to domain name server 104 via network 116 (operation 223). In response to the query, domain name server 104 determines a push-to-talk call server for communication device 112 and transfers the identity of the push-to-talk call server to communication device 112. In this example, domain name server 104 identifies call server 108 as the push-to-talk call server for communication device 112 and transfers information about call server 108 to communication device 112.

Communication device 114 also transmits a query to domain name server 104 via network 116 (operation 223). In response to the query, domain name server 104 determines a push-to-talk call server for communication device 114 and transfers the identity of the push-to-talk call server to communication device 114. In this example, domain name server 104 identifies call server 108 as the push-to-talk call server for communication device 114 and transfers information about call server 108 to communication device 114.

Communication device 112 then attempts to establish a push-to-talk communication session with communication device 114. To establish the push-to-talk session with communication device 114, communication device 112 transfers its IP address and the device identifier for communication device 114 to call server 108 via network 116. Call server 108 receives the IP address of device 112 and the identifier of device 114 (operation 224). In response to receiving the identifier for device 114, call server 108 transfers a query to registration server 106 (operation 226). The query includes the identifier for device 114. In response to the query, registration server 106 transfers the IP address for device 114 to call server 108 via network 116 (operation 228).

Call server 108 then transfers an invite message to communication device 114 using its IP address via network 116 (operation 230). Communication device 114 may reply to call server 108 with a positive response, a negative response, or may not reply at all. A positive response indicates that communication device 114 accepts the invitation from communication device 112 to participate in the push-to-talk communication session. In FIG. 2, communication device 114 transfers a positive response to call server 108.

In response to receiving the positive response to the invite message, call server 108 transfers the IP address of device 112 and the IP address of device 114 to media server 110 via network 116 (operation 232). Media server 110 establishes a first communication session with communication device 112 using its IP address and establishes a second communication session with communication device 114 using its IP address (operation 234). Media server 110 then bridges the first session and the second session to create a push-to-talk session between communication device 112 and communication device 114 (operation 234).

Figure 3:
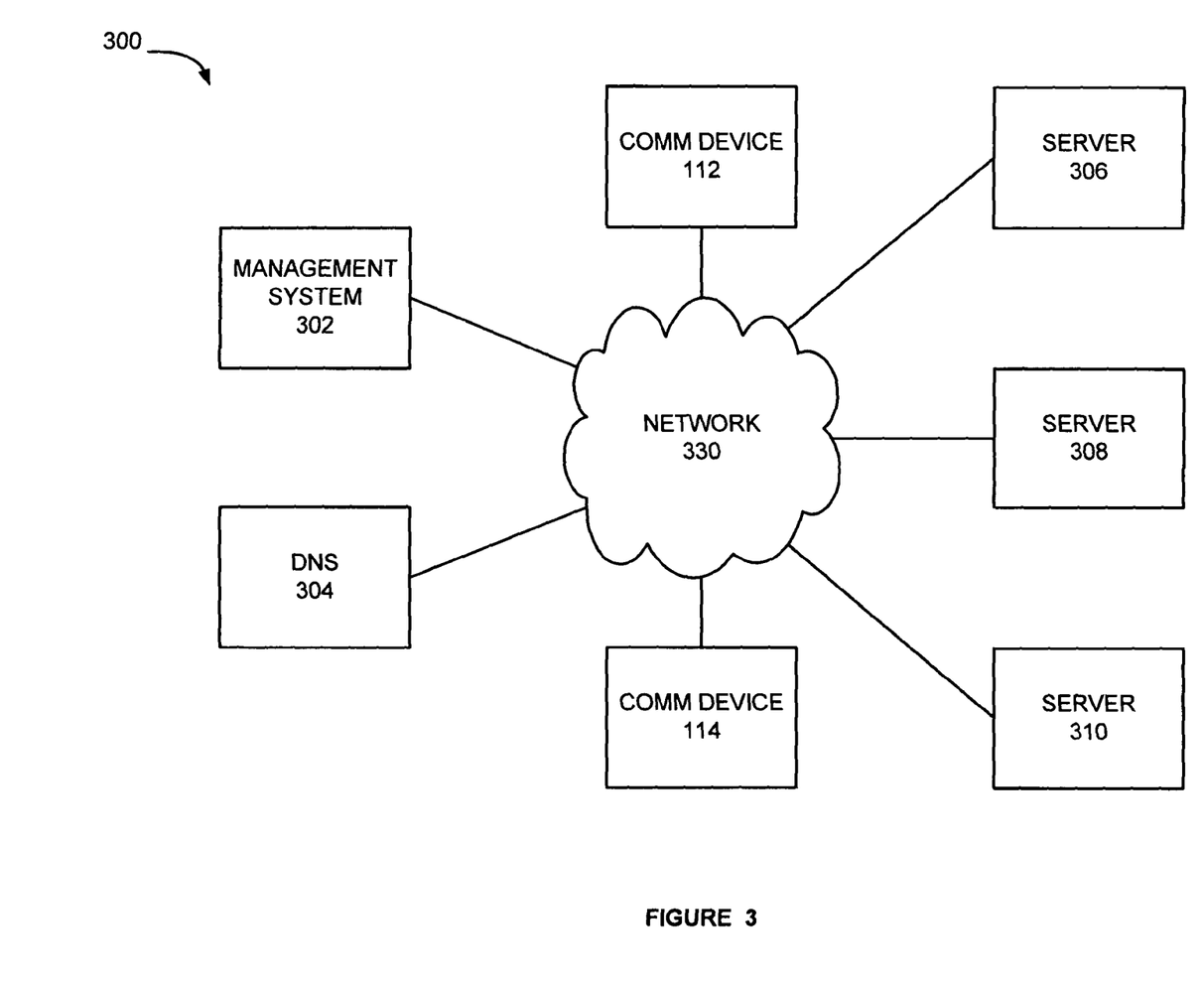
FIG. 3 is a block diagram that illustrates a push-to-talk communication system.

FIG. 3 is a block diagram that illustrates communication system 300. Communication system 300 comprises management system 302, domain name server 304, server 306, server 308, server 310, communication device 312, communication device 314, and network 316. Management system 302, domain name server 304, server 306, server 308, server 310, communication device 312, and communication device 314 are in communication with one another via network 316. Servers 306, 308, and 310 include a database, a storage system, a processing system, operating system software, push-to-talk application software, a communication interface, or any other computer system elements.

Figure 4:
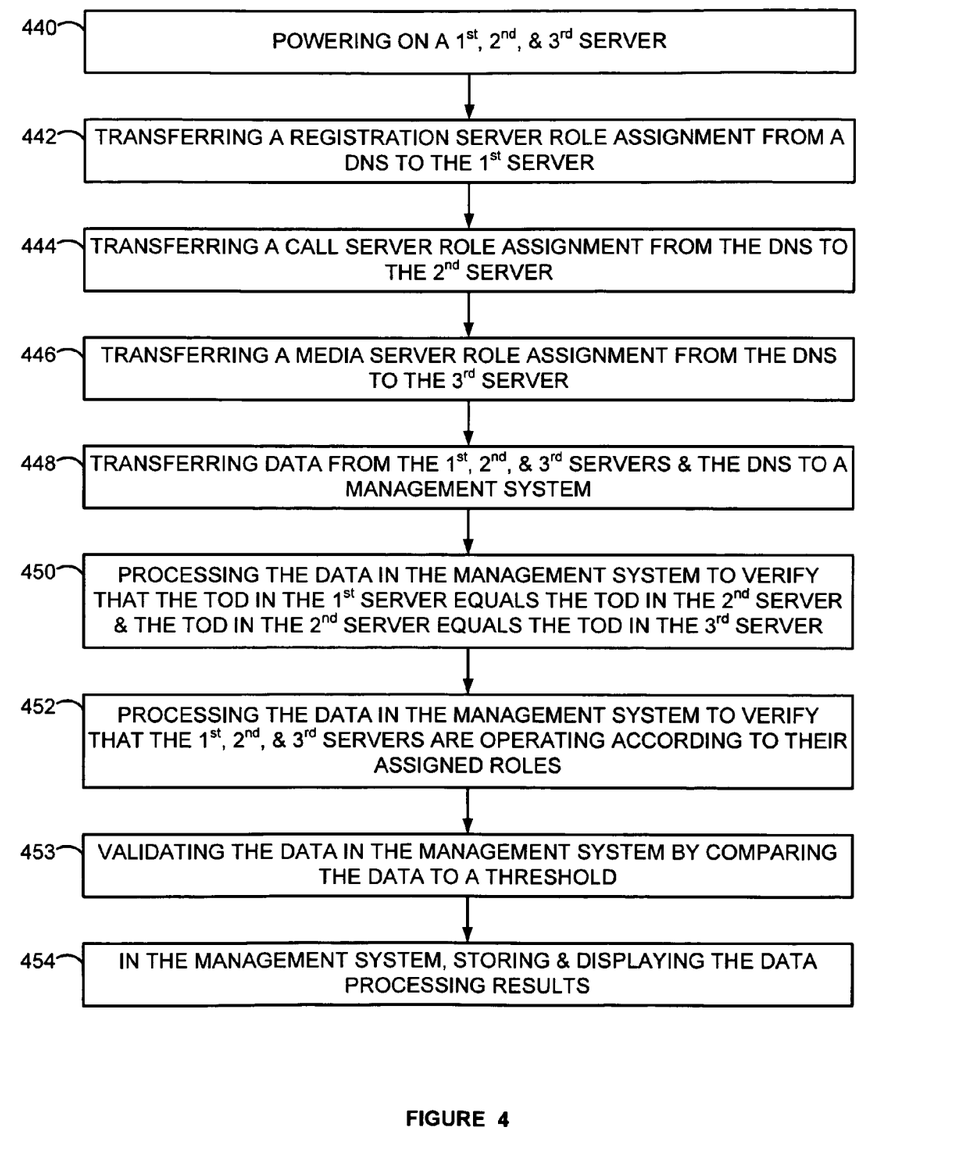
FIG. 4 is a flow diagram that illustrates a method of operating a push-to-talk communication system.

FIG. 4 is a flow diagram that illustrates a method of operating communication system 300. Servers 306, 308, and 310 power on or otherwise become available to network 316 (operation 440). When domain name server 304 is notified that server 306 is available, domain name server 304 evaluates server 306 and the existing network configuration to select an optimal role assignment for server 306. In FIG. 4, domain name server 304 determines that server 306 should be assigned a registration server role. Domain name server 304 transfers a registration server role assignment to server 306 via network 316 (operation 442).

When domain name server 304 is notified that server 308 is available, domain name server 304 evaluates server 308 and the existing network configuration to select an optimal role assignment for server 308. In FIG. 4, domain name server 304 determines that server 308 should be assigned a call server role. Domain name server 304 transfers a call server role assignment to server 308 via network 316 (operation 444).

When domain name server 304 is notified that server 310 is available, domain name server 304 evaluates server 310 and the existing network configuration to select an optimal role assignment for server 310. In FIG. 4, domain name server 304 determines that server 310 should be assigned a media server role. Domain name server 304 transfers a media server role assignment to server 310 via network 316 (operation 446).

In other examples, domain name server 304 may assign different roles to servers 306, 308, and 310. For example, domain name server 304 might transfer the registration server role assignment to server 308, transfer the call server role assignment to server 310, and transfer the media server role assignment to server 306. Servers 306, 308, and 310 are capable of performing any role assigned by domain name server 304.

Referring again to FIG. 4, server 306, server 308, server 310, and domain name server 304 transfer data to management system 302 via network 316 (operation 448). The data is from that server's operating system software and push-to-talk software application. The data indicates push-to-talk support applications, time of day, memory, role assignment, current processing, IP address, host name, network routing table, domain name server accessibility, domain name server association, central processing unit, central processing unit utilization, disk partition utilizations, link status, network configuration, Network Time Protocol (NTP) server status, network time of day, server capacity, or some other information relevant to push-to-talk operations.

In response to receiving data from server 306, server 308, server 310, and domain name server 304, management system 302 processes the data to verify that the time of day in servers 306, 308, 310 is accurate and consistent (operation 450). Servers 306, 308, and 310 should have the same time of day in order for communication device 112 and communication device 114 to communicate successfully with one another in a push-to-talk manner. For example, if communication device 112 and communication device 114 are communicating over a push-to-talk session, servers 306, 308, and 310 must have the same accurate time of day to avoid push-to-talk message time out before a message is received. If servers 306, 308, and 310 do not have a synchronized time of day, then a server may determine that a message is too old and discard the message or terminate the communication.

Also in response to receiving data from servers 304, 306, 308, and 310, management system 302 processes the data to verify that servers 306, 308, and 310 are operating according to the roles assigned by domain name server 304 (operation 452). Management system 302 processes the data from domain name server 304 and server 306 to determine that domain name server 304 transferred a registration server role to server 306 and to verify that server 306 is registering users in accordance with the registration server role. Management system 302 processes the data from domain name server 304 and server 308 to determine that domain name server 304 transferred a call server role to server 308 and to verify that server 308 is setting-up communications in accordance with the call server role. Management system 302 processes the data from domain name server 304 and server 310 to determine that domain name server 304 transferred a media server role to server 310 and to verify that server 310 is transferring media in accordance with the media server role.

Management system 302 processes the data from servers 304, 306, 308, and 310 to validate at least one of operating system information, server capacity, CPU utilization, network routing table, network time of day, and domain name server association (operation 453). The validation process includes comparing the data to one or more thresholds. The thresholds may be determined by a user or may be predetermined values stored in management system 302.

Management system 302 processes data related to a push-to-talk application and data related to one or more applications that support the push-to-talk application from server 306, server 308, server 310, and domain name server 304 to validate the operation of the push-to-talk application and to validate the operation of the one or more applications that support the push-to-talk application (operation 453). The validation process includes comparing the data to one or more thresholds. The thresholds may be determined by a user or may be predetermined values stored in management system 302.

In some implementations, management system 302 stores a planned network configuration and receives data from server 306, server 308, server 310, and domain name server 304 that indicates the actual network configuration (by IP address). Management system 302 processes the actual network configuration and the planned network configuration to validate one or more links in the network configuration. If management system 302 identifies a link in the actual network configuration that is not included in the planned network configuration, then management system 302 reports the link as an unauthorized link. If management system 302 identifies a link in the planned network configuration that is not included in the actual network configuration, then management system 302 reports the link as a missing link.

Processing the planned network configuration and the actual network configuration may include translating an actual internet protocol port combination to a logical link and comparing the logical link to a planned link. Processing the planned network configuration and the actual network configuration may include validating a message queue for each link. Validating the message queue for each link may include comparing the length of the message queue to a threshold. The threshold may be determined by a user or may be a predetermined value stored in management system 302.

In some embodiments, if the actual network configuration is composed of local links, then management system 302 uses local domain name server information to validate one or more links in the network configuration. If the actual network configuration is composed of global links, then management system 302 uses global domain name server information to validate one or more links in the network configuration.

The link check process may provide all server-to-server network layer link conditions at run time. The process may detect and report any network layer failure which causes push-to-talk service degradation or outage. The link check process may detect server-to-server issues at the network layer.

Management system 302 processes the data from server 306, server 308, server 310, and domain name server 304 to determine whether a first server IP address is mated to a second server IP address. If the first server IP address is mated to a second server IP address then the corresponding first and second server may be mated. When servers are mated, they may store the same operating systems, applications, or software. When two servers are mated, one of the mated servers may function as a primary server and the other mated server may function as a standby server. The mated servers may comprise regional servers or national servers.

If management system 302 determines that the first server IP address is mated to a second server IP address, then management system 302 identifies which of the corresponding first and second servers is the primary server and which is the standby server. If a server in the network is in need of maintenance, then management system 302 may determine that the server is operating in a standby mode before the maintenance takes place. Management system 302 would then report that the server in question is ready for maintenance. However, if management system 302 determines that the server in need of maintenance is operating in a primary mode, then management system 302 reports that the server is not ready for maintenance.

Returning to FIG. 3, management system 302 stores and displays the results of the data processing (operation 454). Storing and displaying the results of the data processing may also include storing and displaying the data received from server 306, server 308, server 310, and domain name server 304.

While the operations of the method depicted in FIG. 4 are described above in conjunction with communication system 300 of FIG. 3, the method may be executed by employing other systems or devices in other embodiments. Also, while FIG. 4 indicates a particular order of execution for the operations of the method illustrated therein, other orders of execution, including concurrent execution of one or more of the operations, are possible while remaining within the scope of the invention.

In some embodiments, management system 302 processes stored data to retrieve specific communication files. For example, a specific communication file may be retrieved for use in technical support. While a communication session is taking place, such as a push-to-talk session, management system 302 associates a trace identification number with a push-to-talk session identification number and records the trace identification number with the push-to-talk communication data. The trace identification number, the push-to-talk session identification number, and the push-to-talk communication data may be stored on a registration server, a call server, a media server, or within management system 302.

When a specific communication file is required for technical support, management system 302 retrieves the required data from the registration server, the call server, the media server, or from a storage system within management system 302. If the data is retrieved from management system 302, management system 302 or an operator may filter the data to locate the specific file required. Management system 302 may filter the data based on the trace identification number, a message type, a message code, a target communication device identifier, or a source communication device identifier. Simultaneously, management system 302 may filter the data based on a time/date range.

Filters may filter in records or filter out records based on selected parameters. For example, a filter may be constructed to return all records where the source push-to-talk identification number equals 7202903984, where the target push-to-talk identification number does not equal 9186335293, and where the communication session occurred between 8:00 a.m. and 9:00 a.m. on Jul. 15, 2008.

Further, management system 302 may filter communication data based on a particular parameter, and then search within the filtered files based on other search criteria. For example, management system 302 may filter in all the communication files associated with a particular trace identification number. Then, management system 302 may search within the filtered files for a particular source push-to-talk identification number.

Management system 302 may also retrieve communication data from the registration server, the call server, or the media server. Data stored on the registration server, the call server, and the media server may be collated by a user identification number. Management system 302 may filter data from the registration server based on a user identification number, a time and date, or an IP address. Management system 302 may filter data from the call server based on a source communication device identifier, a target communication device identifier, a time and date, or a communication status. The communication status may include whether the communication failed or was successful, and why a failure occurred. Management system 302 may filter data from the media server based on a user identification number, a time and date, an IP address, a user name, a duration of the communication, a location of the source communication device, or a location of the target communication device.

Management system 302 stores and displays the results of the data processing, including filter parameters, search criteria, filter results, and search results.

Figure 5:
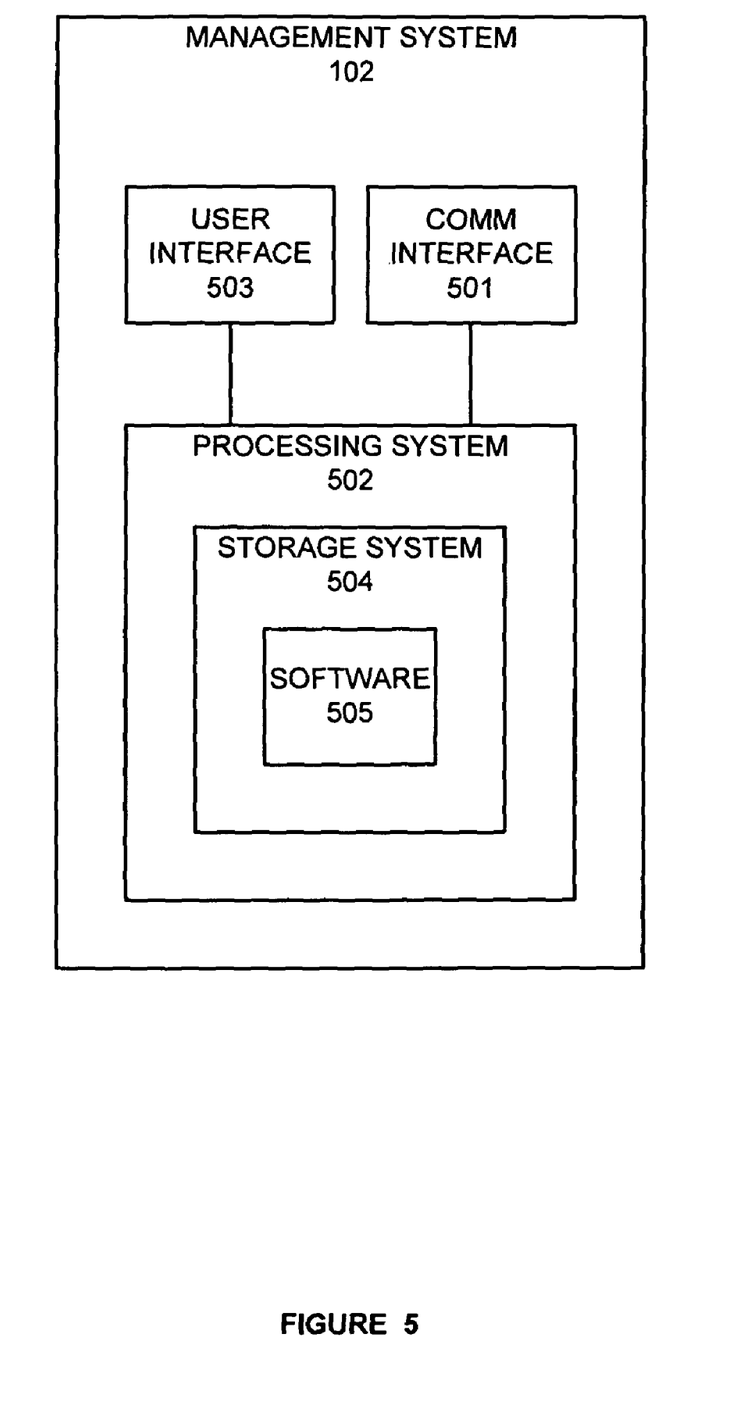
FIG. 5 is a block diagram that illustrates a push-to-talk management system.

FIG. 5 is a block diagram that illustrates management system 102. Management system 102 includes communication interface 501, processing system 502, and user interface 503. Processing system 502 includes storage system 504. Storage system 504 stores software 505. Processing system 502 is linked to communication interface 501 and user interface 503. Management system 102 could be comprised of a programmed general-purpose computer, although those skilled in the art will appreciate that programmable or special purpose circuitry and equipment may be used. Management system 102 may be distributed among multiple devices that together comprise elements 501-505.

Communication interface 501 could comprise a network interface, port, transceiver, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. User interface 503 may be distributed among multiple user devices. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a computer system. Software 505 could comprise an application program, firmware, or some other form of machine-readable processing instructions. When executed by processing system 502, software 505 directs processing system 502 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a push-to-talk communication system, the method comprising:
    transferring a push-to-talk registration server role, a push-to-talk call server role, and a push-to-talk media server role from a domain name server;
    receiving the push-to-talk registration server role in a first server, and in response, registering users to perform the push-to-talk registration server role and maintaining a first time of day;
    receiving the push-to-talk call server role in a second server, and in response, establishing push-to-talk calls to perform the push-to-talk call server role and maintaining a second time of day;
    receiving the media server role in a third server, and in response, transferring push-to-talk media to perform the media server role and maintaining a third time of day;
    in a management system, receiving data from the first server, the second server, the third server, and the domain name server, processing the data to verify that the first time of day, the second time of day, and the third time of day are synchronized, and to verify that the first server is performing the registration server role, the second server is performing the call server role, and the third server is performing the media server role.

2. The method of claim 1 wherein receiving the data from the first server, the second server, and the third server comprises receiving the data from a first operating system and a first push-to-talk application in the first server, from a second operating system and a second push-to-talk application in the second server, and from a third operating system and a third push-to-talk application in the third server.

3. The method of claim 2 wherein the data from the first operating system indicates first processes being performed by the first push-to-talk application to perform the registration server role, the data from the second operating system indicates second processes being performed by the second push-to-talk application to perform the call server role, and the data from the third operating system indicates third processes being performed by the third push-to-talk application to perform the media server role.

4. The method of claim 3 further comprising processing the first processes to assess the performance of the registration server role in the first server, processing the second processes to assess the performance of the call server role in the second server, and processing the third processes to assess the performance of the media server role in the third server.

5. The method of claim 1, further comprising in the domain name server:
    receiving a first message from the first server, and in response, selecting the registration server role for the first server;
    receiving a second message from the second server, and in response, selecting the call server role for the second server; and
    receiving a third message from the third server, and in response, selecting the media server role for the third server.

6. The method of claim 1 wherein receiving the data from the first server, the second server, the third server comprises receiving first internet protocol addresses used by the first server, receiving second internet protocol addresses used by the second server, and receiving third internet protocol addresses used by the third server, and further comprising in the management system, processing the first internet protocol addresses, the second internet protocol addresses, and the third internet protocol addresses to identify unauthorized ones of the internet protocol addresses.

7. The method of claim 6 wherein processing the first internet protocol addresses, the second internet protocol addresses, and the third internet protocol addresses to identify the unauthorized internet protocol addresses comprises translating the first internet protocol addresses, the second internet protocol addresses, and the third internet protocol addresses into communication links and comparing the communication links to an authorized link configuration.

8. The method of claim 7 wherein receiving the data from the first server, the second server, the third server comprises receiving message queue information associated with the communication links.

9. The method of claim 8 further comprising in the management system, processing the message queue information associated with the communication links to assess the performance of the registration server role in the first server, to assess the performance of the call server role in the second server, and to assess the performance of the media server role in the third server.

10. The method of claim 1 further comprising in the management system, processing the data to determine if the first server, the second server, and the third server are operating in a primary mode or a back-up mode.

11. A push-to-talk communication system comprising:
    a domain name server configured to transfer a push-to-talk registration server role, a push-to-talk call server role, and a push-to-talk media server role;
    a first server configured to receive the push-to-talk registration server role, and in response, to register users to perform the push-to-talk registration server role, and to maintain a first time of day;
    a second server configured to receive the push-to-talk call server role, and in response, establish push-to-talk calls to perform the push-to-talk call server role, and to maintain a second time of day;

a third server configured to receive the media server role, and in response, transfer push-to-talk media to perform the media server role, and to maintain a third time of day;

a management system configured to receive data from the first server, the second server, the third server, and the domain name server, and to process the data to verify that the first time of day, the second time of day, and the third time of day are synchronized, and to verify that the first server is performing the registration server role, the second server is performing the call server role, and the third server is performing the media server role.

12. The push-to-talk communication system of claim 11 wherein the data comprises data from a first operating system and a first push-to-talk application in the first server, from a second operating system and a second push-to-talk application in the second server, and from a third operating system and a third push-to-talk application in the third server.

13. The push-to-talk communication system of claim 12 wherein the data from the first operating system indicates first processes being performed by the first push-to-talk application to perform the registration server role, the data from the second operating system indicates second processes being performed by the second push-to-talk application to perform the call server role, and the data from the third operating system indicates third processes being performed by the third push-to-talk application to perform the media server role.

14. The push-to-talk communication system of claim 13 wherein the management system is configured to process the first processes to assess the performance of the registration server role in the first server, process the second processes to assess the performance of the call server role in the second server, and process the third processes to assess the performance of the media server role in the third server.

15. The push-to-talk communication system of claim 11 wherein the domain name server is configured to receive a first message from the first server, and in response, select the registration server role for the first server, receive a second message from the second server, and in response, select the call server role for the second server, and receive a third message from the third server, and in response, select the media server role for the third server.

16. The push-to-talk communication system of claim 11 wherein the data from the first server, the second server, and the third server comprises first internet protocol addresses used by the first server, second internet protocol addresses used by the second server, and third internet protocol addresses used by the third server, and wherein the management system is configured to process the first internet protocol addresses, the second internet protocol addresses, and the third internet protocol addresses to identify unauthorized ones of the internet protocol addresses.

17. The push-to-talk communication system of claim 16 wherein the management system is configured to translate the first internet protocol addresses, the second internet protocol addresses, and the third internet protocol addresses into communication links and compare the communication links to an authorized link configuration.

18. The push-to-talk communication system of claim 17 wherein the data from the first server, the second server, the third server comprises message queue information associated with the communication links.

19. The push-to-talk communication system of claim 18 wherein the management system is configured to process the message queue information associated with the communication links to assess the performance of the registration server role in the first server, to assess the performance of the call server role in the second server, and to assess the performance of the media server role in the third server.

20. The push-to-talk communication system of claim 11 wherein the management system is configured to process the data to determine if the first server, the second server, and the third server are operating in a primary mode or a back-up mode.

* * * * *